United States Patent [19]

Takahashi et al.

[11] 4,366,529
[45] Dec. 28, 1982

[54] OPTICAL SOURCE UNIT FOR AN ENDOSCOPE

[75] Inventors: Nagashige Takahashi, Tokyo; Shinichi Harada, Urawa, both of Japan

[73] Assignee: Kabushiki Kaisha Medos Kenkyusho, Tokyo, Japan

[21] Appl. No.: 25,621

[22] Filed: Mar. 30, 1979

[30] Foreign Application Priority Data

Apr. 1, 1978 [JP] Japan .............................. 53/42876[U]
Apr. 5, 1978 [JP] Japan .................................. 53/40651

[51] Int. Cl.³ ............................................ G03B 15/02
[52] U.S. Cl. .......................................... 362/4; 362/5; 362/32; 362/263; 362/276; 362/321
[58] Field of Search .................. 362/4, 5, 32, 263, 276, 362/321

[56] References Cited

U.S. PATENT DOCUMENTS 4,053,756 10/1977 Takahashi .............................. 362/32
4,110,820 8/1978 Konoshima ............................ 362/32

Primary Examiner—Stephen J. Lechert, Jr.
Attorney, Agent, or Firm—Sughrue, Mion, Zinn, Macpeak & Seas

[57] ABSTRACT

An illumination device for photographing a portion of the body cavity to be examined with an endoscope having a light source using a discharge tube circuit for illuminating the portion to be examined and a mechanical shutter arranged in the optical path of illuminating light from the light source. A light quantity detecting circuit detects information on the brightness of illumination of the light source and a correct exposure time setting circuit together a correct exposure time estimating circuit receive the output from the light quantity detecting circuit. The closure of the mechanical shutter is controlled by the control operations of the correct exposure time setting circuit and correct exposure time estimating circuit. The discharge tube circuit comprises a time constant circuit, a relay circuit and a high voltage circuit. The high voltage circuit is controlled by the relay circuit to intermittently apply a voltage to start discharge until ignition takes place.

9 Claims, 5 Drawing Figures

OPTICAL SOURCE UNIT FOR AN ENDOSCOPE

BACKGROUND OF THE INVENTION

This invention relates to an optical light source unit for an endoscope used to observe and photograph the body cavity.

The endoscope is provided with a flexible pipe, small in diameter, which is inserted into the body cavity. When the top end of the flexible pipe reaches a portion of the body cavity to be examined, the portion is optically observed or photographed through the window provided at the top end of the flexible pipe by means of glass fibers incorporated in the flexible pipe. For this purpose, the endoscope requires an artificial optical light source for illuminating the body cavity.

In an optical light source unit for an endoscope of this type, for use in the above-described observing optical system, an illuminating light beam is directed to a portion of the body cavity to be examined through a bundle of optical fibers incorporated in the flexible pipe. That is, it is necessary to apply illuminating light of high intensity from the optical source to the bundle of optical fibers having a limited optical conductive area. Furthermore, it is necessary to minimize thermal damage to the body cavity which may be caused by the illumination. In order to meet these requirements, a xenon discharge tube is generally employed as the optical source thereof.

The discharge tube in the unit requires the application of a high voltage for starting its discharge. In applying this high voltage to start the ignition of the discharge tube, in the conventional unit, a high voltage is applied to the discharge tube by depressing the start button, and the start button is released after the operator has visually detected that the discharge tube has ignited.

According to this ignition starting operation, the start button must be continuously depressed until the ignition maintaining state is established, and accordingly the discharge tube and its circuit means are forcibly placed under severe conditions by application of the high voltage. When the ignition maintaining state has been established in the discharge tube, it is one of the causes tending to lower the durability of the discharge tube.

Also, it is vitally necessary in using the endoscope that a part of the optical source unit be inserted into the body cavity. Therefore, special care must be paid to the prevention of the leakage of high voltage of the optical source unit to the endoscope.

In photographing the body portion to be examined, high speed shutter control is required to obtain a clear image of the portion. For this purpose, it is necessary to provide illuminating light much higher in intensity than the above-described observing illuminating light. Moreover, in view of the aforementioned problem of thermal damage to the body cavity, the high brightness illumination for photographing the portion to be examined should be limited to a period of time as short as possible, or only to a period of time required for the photgraphing operation.

The requirements for the optical source unit made by taking the body cavity to be examined into consideration are as described above. Furthermore, the optical light source unit should meet certain functional requirements to satisfy variable photographing conditions according to various portions of the body cavity and the physical characteristics of the various portions. Accordingly, the optical source unit of this type must be capable of emitting light which is sufficient in intensity to permit the photographing operation at a high shutter speed and to meet variable photographing conditions over a wide range.

In a photographing operation under illumination effected by an optical light source unit capable of emitting high intensity light as described above, the time lag of the shutter operation which may occur in an ultra-high speed photographing operation, as in the case of a closeup, is an appreciable factor causing exposure error. Therefore, an effective optical source unit cannot be obtained without solving the problem of time lag.

SUMMARY OF THE INVENTION

Accordingly, an object of this invention is to provide an optical source unit employing at least two optical source control modes. In a first mode, the mechanical shutter is closed when an ordinary correct exposure state is obtained, according to the brightness of the portion of the body cavity to be examined, which is illuminated by an artificial high intensity optical source. In second mode, the artificial optical source and the mechanical shutter, or only the artificial optical source, is controlled according to an estimation signal corresponding to the brightness of the portion to be examined, to make the illumination time as short as possible, and to correct any exposure error due to the time lag of the mechanical shutter, to obtain a correct exposure time.

It is another object of this invention to provide an optical illumination source unit that overcomes the deficiencies of the prior art.

It is yet another object of this invention to provide an optical illumination source unit that eliminates the leakage of high voltage to the endoscope.

This invention will be described in detail with respect to the drawings and the description of the preferred embodiment that follows.

This invention will be described with reference to the accompanying drawings and the preferred embodiment that follows.

DESCRIPTION OF THE PREFERRED EMBODIMENTS

Figure 1:
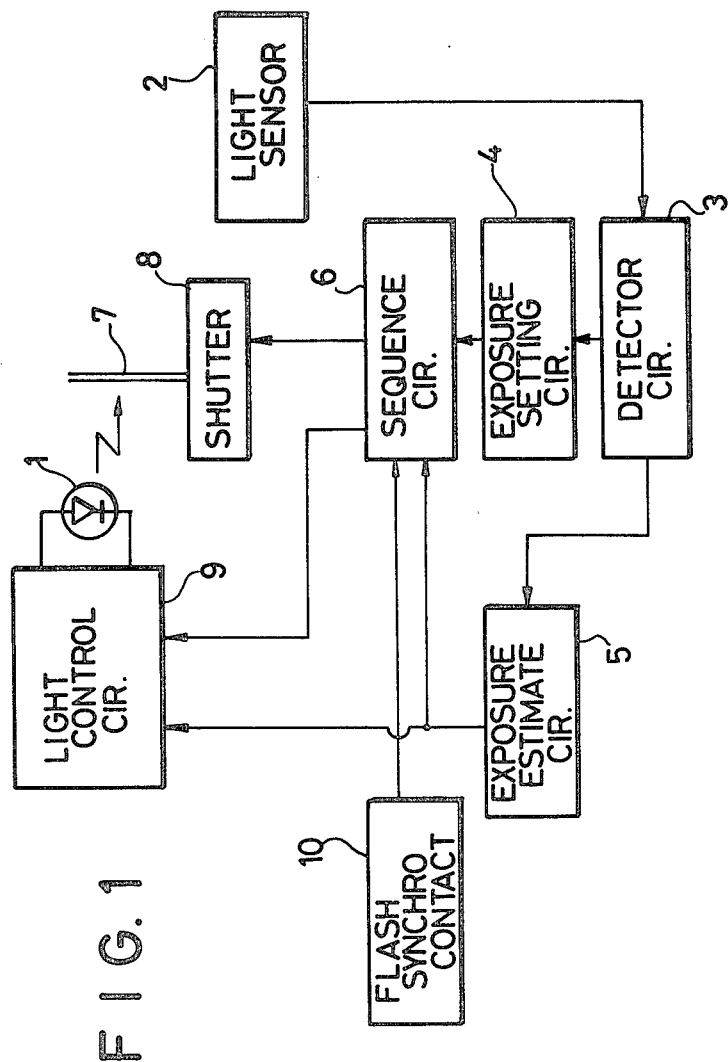
FIG. 1 is a block diagram showing one example of an optical source unit according to this invention.

FIG. 1 is a block diagram showing one preferred example of an optical light source unit for an endoscope according to the invention. A light receiving element 2 receives a light beam reflected by a portion of a body cavity to be examined, which is illuminated by an optical source lamp 1 such as a xenon discharge tube. The light receiving element 2 is a sensing element of a light quantity detecting circuit 3 to which a correct exposure time setting circuit 4 and a correct exposure time estimating circuit 5 are connected.

The light quantity detecting circuit 3 operates to integrate the current representative of the brightness information corresponding to the brightness of the portion to be examined, which is furnished by the light receiving element 2, and the resulting integration value is applied to the correct exposure time setting circuit 4. The correct exposure time setting circuit comprises, for instance, a switching circuit and to the correct exposure time estimating circuit 5 comprises, for instance, a differentiating circuit. Both of these circuits are well known in the art.

A correct exposure signal is applied from the exposure setting circuit 4 through a sequence circuit 6 to a mechanical shutter 8 whose shutter blade 7 is provided to intercept the illuminating light beam from the optical source lamp 1. An estimation signal is applied from the estimating circuit 5 to a lighting control circuit 9 adapted to control the lighting intensity of the optical light source lamp 1. This circuit will be explained in detail with respect to FIG. 3. The estimation signal is further applied through the sequence circuit 6 to the mechanical shutter 8.

The sequence circuit 6 is connected to the lighting control circuit 9 through an output line which is provided for applying a signal which is generated in response to the arrival of the correct exposure signal. In FIG. 1, reference numeral 10 designates a flash synchro contact mechanism for a camera. The flash synchro contact mechanism 10 is connected through an output line to the sequence circuit 6.

Figure 2:
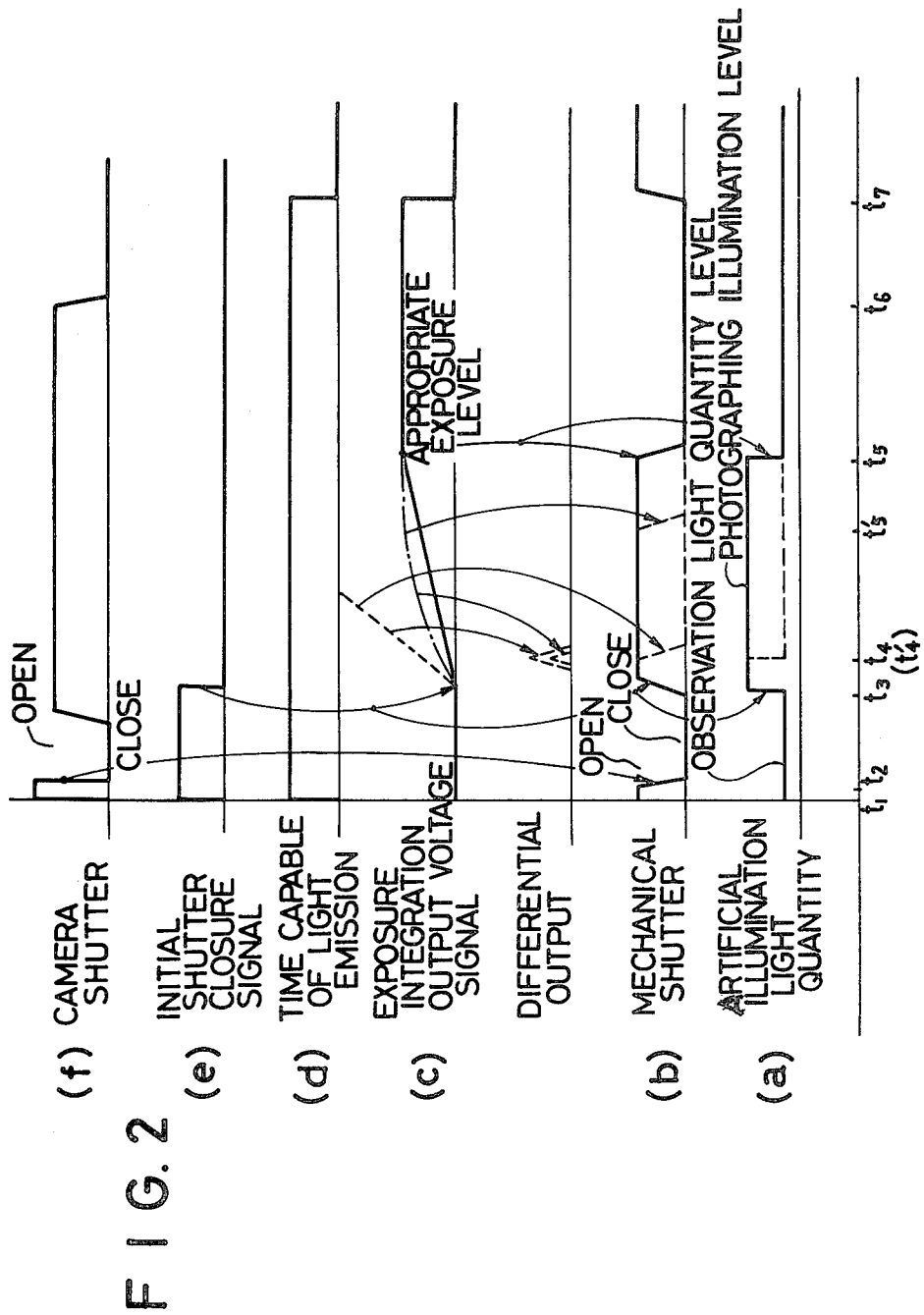
FIG. 2 is a time chart for a description of the essential components of the optical source unit according to the invention.

The operation of the optical source unit thus organized will be described with reference to a sequence time chart shown in FIG. 2.

The optical light source lamp 1, under the control of the lighting control circuit 9, serves as a source of observation illumination light; that is, it is operable in a low level light emission state indicated by "Observation Light Quantity Level" in FIG. 2(a). When the camera shutter is operated after the observation state is shifted to the photographing state (time instant $t_1$), a synchronizing signal is applied from the flash synchro contact mechanism 10 to the sequence circuit 6 in synchronization with the operation of the camera shutter, whereby the sequence circuit 6 is operated. The control operation of the sequence circuit 6 is as follows: First, in order to eliminate an exposure error due to the fluctuation in time of the FP contact of the camera, a high level signal indicated as "Initial Shutter Closure Signal" in FIG. 2(e) is applied to the mechanical shutter 8 (time instant $t_2$, FIG. 2(b)) to close the shutter blade 7 for a predetermined period of time (20 ms in FIG. 2(e)). After the lapse of this predetermined period of time, the level of the closure signal is lowered to the low level. As a result the mechanical shutter 8 starts to open.

On the other hand, while the mechanical shutter 8 is being maintained temporarily closed, the camera shutter is maintained open by the control mechanism provided in the camera. When the level of the closure signal is lowered as described above, the lighting control circuit 9 receiving the closure signal abruptly increases the light output of the optical source lamp 1, and the light quantity detecting circuit 3 starts its detecting operation. The light quantity detecting circuit 3 receives, through the light receiving element 2 the light beam reflected by the portion to be examined, which is greatly illuminated as the mechanical shutter 8 is opened and the intensity of the optical source lamp 1 is increased. The circuit 3 will integrate the current based on the optical information received. The rise of the exposure integration output voltage signal (FIG. 2(c)) of the light quantity detecting circuit 3 is subjected to differentiation detection in the correct exposure time estimating circuit 5.

When this rise is extremely steep (indicated by the dotted line as the output of the light quantity detecting circuit in FIG. 2(c)), when the brightness of the portion to be examined is extremely high under the photographing conditions at that time, the differentiation output is as indicated by the dotted line in FIG. 2(c) (time instant $t_4$). If this differentiation output is higher than a predetermined value, then the lighting control circuit 9 and the sequence circuit 6, receiving the differentiation output, reduces the quantity of light of the optical source lamp 1 as indicated by the dotted line in FIG. 2(a) and closes the mechanical shutter 8 as indicated by the dotted line in FIG. 2(b).

As a result of this operation, the intensity of the illuminating light is reduced, the mechanical shutter is closed, and accordingly the photographing operation is terminated. The output level set with respect to the above-described differentiation output for this control is a value which is obtained from the steep rise of the light quantity output voltage with the high brightness of the portion to be examined. In the relationship between the intensity of illuminating light calculated in advance and the time lag in closure operation of the mechanical shutter, over exposure may occur as a result of the exposure control accompanying the time lag of the mechanical shutter with the quantity of light of the illuminating light reduced. The output level can be readily set by calculation and calibration.

When the differentiation output is a signal whose level is lower than the preset value, i.e., when the brightness of the portion to be examined is lower than that in the above-described photographing operation, the output of the light quantity detecting circuit 3 is increased as indicated by the solid line in FIG. 2(c). With the output in this state, the aforementioned differentiation output of the correct exposure time estimating circuit 5 is not provided, or if provided, it is a low level signal insufficient to permit the operations of the sequence circuit 6 and the lighting control circuit 9. Therefore, while the illumination state and the shutter state are maintained as they are, the predetermined period of time elaspes (correct exposure time). With the lapse of this time, the integration output of the light quantity detecting circuit 3 is increased, and in response to the increment of the integration output the correct exposure time setting circuit 4 operates to deliver its output to the sequence circuit 6 (time instant $t_5$). As a result, the circuit 6 operates to close the mechanical shutter 8 and to cause the lighting control circuit 9 to reduce the output of the lamp 1.

Thus, the optical source control operation in the ordinary exposure setting operation has been completed. Then, the subsequent operations of the various mechanisms are carried out as follows: At the time instant $t_6$ the camera shutter is closed by the control operation effected in the camera and at the time instant $t_7$ the states of the various mechanisms are restored to their initial states according to the control value which has been set as the longest flashing time for the photographing operation in the sequence circuit 6. For instance, the light quantity detecting circuit 3 is reset and the mechanical shutter 8 is opened for observation.

As is apparent from the above description, the brightness of the portion to be examined can be controlled over a wide range according to a first control operation in which the optical source and the mechanical shutter are controlled by the exposure time estimation value with the preset brightness as a limit, according to the brightness of the portion to be examined. According to a second control operation the mechanical shutter is controlled, in accordance with the ordinary exposure time setting, by the integration of the brightness information.

In another example of the optical source unit according to the invention, a third control operation is provided between the first and second control operations described above, so that the brightness of the portion to be examined can be controlled over a wider range, and the control operations can be smoothly switched.

When, in the case where the brightness of the portion to be examined is between those in the aforementioned first and second control operations, the correct exposure cannot be obtained from the time lag of the mechanical shutter with the high intensity of illuminating light from the optical source lamp 1. The rise of the integration output of the light quantity detecting circuit 3 is relatively moderate as indicated by the one-dot chain line in FIG. 2(c), and the differentiation output of the correct exposure time estimating circuit 5 is therefore produced at the time instant $t_4$, in FIG. 2. The level of the differentiation output in this case is somewhat low in correspondence to the rise of the integration output of the light quantity detecting circuit 3. The differentiation output is classified with a certain level value thereof as a boundary, so that with the differentiation output of the higher level, control is carried out in accordance with the first control operation described above. With the differentiation output of the lower level, the lighting control circuit 9 is operated to reduce the output of the lamp 1 as indicated by the one-dot chain line in FIG. 2(a) but the sequence circuit 6 is not operated. As a result the mechanical shutter 8 is maintained open. Since the output of the optical source lamp 1 is reduced, the integration output of the light quantity detecting circuit 3 is gradually increased as indicated in FIG. 2(c), and when the integration output reaches the trigger level of the correct exposure time setting circuit 4 (time instant $t_5'$), the mechanical shutter 8 is controlled in accordance with the second control operation described above.

The differentiation output may be classified by utilizing a comparator or the like with the preceding output level as a reference, or by interposing a gate circuit in the input line to the sequence circuit 6 with the generation time as a reference.

As is apparent from the above description, the optical source unit according to the invention is provided not only with means for detecting the quantity of light from the integration operation based on the information of the brightness of the portion to be examined which is artificially illuminated, but also with means for estimating the exposure time from the differentiation operation. When the estimation value is smaller than the predetermined value, the illuminating optical source and the shutter are controlled before the correct exposure signal is provided by the integration operation. Therefore, exposure control can be achieved with high accuracy in which the illuminating optical source is operated for a short time and the exposure error due to the time lag of the mechanical shutter is minimized. With this control system, using a high optical source, the brightness in artificial illumination can be changed to a suitable value for the photographing conditions over a wide range. Therefore the range of photographing conditions permitting exposure settings can be increased.

Furthermore, the estimation value is classified according to the invention, and in accordance with the estimation value thus classified, the optical source and the mechanical shutter are controlled or only the optical source is controlled. Therefore, the range of suitable photographic conditions is increased, and the control operations can be smoothly changed. This results in exposure control of accuracy higher within the range of control. Thus, the optical source unit according to the invention is a significant useful improvement with an endoscopic usage.

In addition, with respect to the different exposure control operations in the optical source unit according to the invention, another control operation, that is, an intermediate means of closing the shutter a predetermined period of time after the optical source control may be provided between the aforementioned different exposure control operations. The provision of such an intermediate means can be readily achieved in the optical source unit according to the invention.

Figure 3:
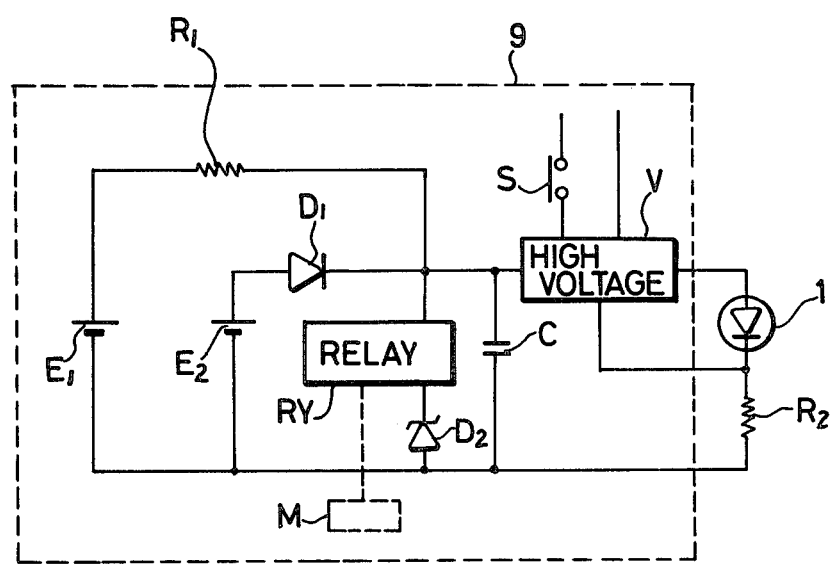
FIG. 3 is a circuit diagram showing one example of an optical source unit according to this invention.
Figure 4:
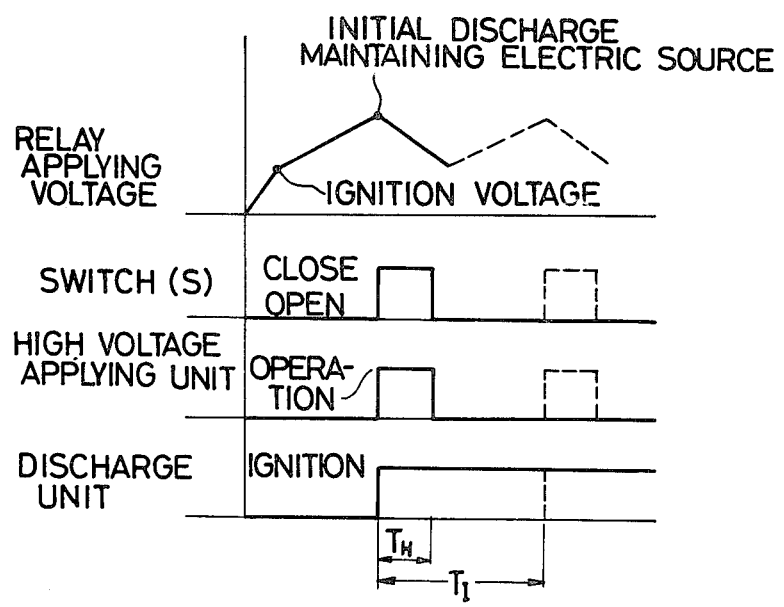
FIG. 4 is a time chart for a description of the operations of the essential components of the optical source unit shown in FIG. 1.
Figure 5:
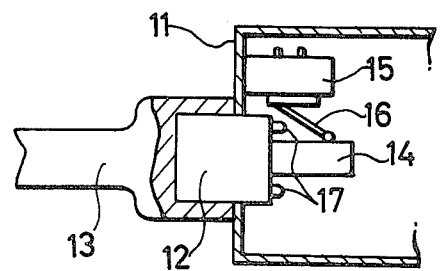
FIG. 5 is a fragmental sectional view showing one example of a connecting device which can be effectively provided for the optical source unit according to the invention.

Referring now to FIGS. 3–5, the optical light source unit will be explained in detail.

FIG. 3 is a circuit diagram of one example of an optical source unit forming a portion of the light control unit 9 according to this invention. An initial discharge maintaining electric source $E_1$ is connected in series to a high resistor $R_1$ to form a first series circuit, and an ordinary discharge electric source $E_2$ is forwardly connected to a diode $D_1$ to form a second series circuit. These two series circuits are connected in parallel to each other, thereby to form a discharge current circuit for a discharge tube 1.

In FIG. 3, reference character RY designates a relay and its drive circuit. The drive circuit RY is connected in series to a Zener diode $D_2$ to form a third series circuit, which is connected in parallel to the above-described first and second series circuits. A capacitor C is connected in parallel to the third series circuit formed with the drive circuit RY and the Zener diode $D_2$. The capacitor forms a CR time constant circuit with the high resistor $R_1$. A high voltage applying device V is to generate a high voltage for starting the discharge tube 1.

In the electric source circuit of the high voltage applying device V, a switch S operating in response to the operation of the drive circuit RY is directly inserted. In FIG. 3, reference character $R_2$ designates a low value resistor connected in series to the discharge tube 1. Furthermore, a timer M acts on the drive circuit RY is indicated by the dotted line in FIG. 3. The timer M is designed so that it is operated by an electronic means such as light control circuit 9, a mechanical means or a bi-metal means when it has passed a predetermined time. The timer M may be so designed that it acts on the high voltage applying device V directly.

FIG. 4 is a time chart for a description of the operations of the essential components of the unit according to this invention. FIG. 5 is a vertical sectional view of one example of a connecting device which is additionally provided for the unit according to the invention. When an endoscope connecting means 13 is connected to a connecting mechanism 12 provided on an optical source unit housing 11, the rod 14 thereof protrudes into the housing 11. A switching member 15 for controlling the electric source circuit of the high voltage applying device V, etc., in the circuitry shown in FIG. 3 is provided inside the housing 11 so that the switching lever of the switching means 15 is operated by the rod 14 protruding into the housing. In FIG. 5, reference numeral 17 designates connecting pins for changing the electrical state when the connecting mechanism 12 is connected to the connecting means 13.

In the unit of the invention thus organized, when the main switch is turned on, immediately the initial discharge maintaining voltage $E_1$ and the ordinary discharging voltage $E_2$ are generated to charge the capacitor C respectively through the high resistor $R_1$ and the diode $D_1$. When the voltage across the capacitor C, i.e., the voltage across the relay and its drive circuit RY is increased as shown in FIG. 4(d) to reach the initial discharge maintaining voltage, current is allowed to flow in the drive circuit RY by the breakdown voltage operation of the Zener diode $D_2$. Hence, the switch S is closed and a high voltage is generated in the high voltage applying device V. This high voltage is applied to the electrodes of the discharge tube 1 which has received the electric source voltage which has previously reached the initial discharge maintaining voltage. Hence, the discharge tube 1 starts its discharging operation. Therefore, the capacitor C is abruptly discharged through the discharge tube 1 and the low resistor $R_2$ and accordingly the voltage across the capacitor C is decreased. As a result, application of the current to the drive circuit RY controlled by the Zener diode $D_2$ is interrupted, the switch S is opened, and the operation of the high voltage applying device V is suspended.

After starting the discharging operation on the initial discharge maintaining voltage, the discharge tube 1 continues the discharging operation on an electric power supplied by the electric source $E_2$. That is, the discharge tube 1 is continuously turned on.

In the case where the discharging operation of the discharge tube 1 is not maintained by application of the high voltage generated when the drive circuit RY is operated, the capacitor C is again charged by the electric sources $E_1$ and $E_2$ immediately after the preceding start discharge. After the lapse of the time $T_I$ (FIG. 2) the above-described high voltage generating operation is repeated. This operation is repeatedly effectuated with a time width $T_H$ and a period $T_I$ until the discharge tube 1 is illuminated.

In the case where discharge tube 1 is not illuminated because the discharge tube 1 itself or the circuit has deteriorated, the above-described repetitive operation is useless. Therefore, the timer M is designed to suspend the high voltage applying operation to light the discharge tube 1, after the lapse of a predetermined period of time. This reduces the power consumption and prevents damage to the circuits.

In the above-described operation of the unit according to the invention, the high voltage generation time is limited to a minimum value required for starting the ignition of the discharge tube, and therefore the probability of difficulties such as for instance electric leak is reduced. Furthermore, the use of the means shown in FIG. 5 for the unit according to the invention can improve the safety or security of the unit due to the following reason: When the endoscope connecting means is connected to the connecting mechanism 12 of the optical source unit housing 11, the switching means 15 is operated by the rod 14 protruding into the housing and the electrical state is changed by the connecting pins 17. That is, the electrical condition is detected by the insertion of the rod 14 or by the connecting pins 17, and accordingly the generation of the high voltage can be stopped by controlling the electric source of the high voltage applying device.

Under the condition that the generation of the high voltage is stopped, the discharge tube is not illuminated even if the intermittent operation of the relay and its drive circuit RY is continued. Therefore, the use can readily detect that the state of use of the unit is unsatisfactory. In this case, if the connecting means 13 is disconnected from the connecting mechanism 12 to the extent that the former is not electrically connected to the latter during the period of time in which the time M permits the operation of the circuit RY, then the security action of the switching means 15 or the connecting pins 17 are released. Therefore, the state of the unit can be shifted to the ignition starting state without carrying out the start operation of the optical source unit agains.

As is apparent from the above description, in the unit according to this invention, the high voltage for starting the ignition of the discharge tube is intermittently, repeatedly, and automatically generated until the discharge tube is illuminated, and therefore the operation is very simple. Since generation and application of the high voltage are effected only for the minimum period of time necessary for starting the ignition of the discharge tube, the deterioration of the discharge tube and the relevant circuit can be minimized. Furthermore, the optical light source has an additional merit in that the timer means and the security means can be readily employed.

It is apparent that modifications of this invention can be made without departing from the scope thereof.

What is claimed is:

1. In an illumination device for photographing a portion of the body cavity to be examined with an endoscope having a light source with a discharge tube for illuminating the portion to be examined and a mechanical shutter arranged in the optical path of illuminating light from said light source, and optical source unit comprising: a light quantity detecting circuit for detecting information on the brightness of illumination of said light source, a correct exposure time setting circuit, and a correct exposure time estimating circuit coupled to said light quantity detecting circuit; wherein, the closure of said mechanical shutter is controlled by the control operations of said correct exposure time setting circuit and said correct exposure time estimating circuit, a correct exposure time being estimated by said correct exposure time estimating circuit in the initial period of exposure detection to provide an estimation value, whereby said correct exposure time estimating circuit produces control signals for said light source and said mechanical shutter.

2. In an illumination device for photographing a portion of a body cavity to be examined with an endoscope having a light source having a discharge tube for illuminating the portion to be examined and a mechanical shutter arranged in the optical path of illuminating light from said light source, an optical source unit comprising: a light quantity detecting circuit for detecting information on the brightness of illumination of said light source; circuit means for determining a correct exposure time and circuit means for estimating correct exposure time, each coupled to said light quantity detecting circuit; wherein the closure of said mechanical shutter is controlled by the control operations of said circuit means for determining a correct exposure time estimating circuit, the quantity of light emitted by said light source controlled according to information provided by said circuit means for estimating correct exposure time; said circuit means for estimating correct exposure time classifying an estimation value in the initial period of exposure detection, whereby when the estimation value is classified, a control signal based on a first estimation value representative of a short time is utilized to control both of said light source and said mechanical shutter, and a control signal based on an estimation value other than said first estimation value is utilized to control only said light source.

3. The device of claim 1 or 2 further comprising a sequence circuit receiving the outputs of said correct value exposure time setting circuit and said correct exposure time estimating circuit, said sequence circuit providing control signals to said light source and said mechanical shutter.

4. The device of claim 1 or 2 further comprising sensor means receiving light reflected by said portion to be examined and providing an output to said light quantity detecting circuit.

5. The device of claim 3 further comprising a light control circuit receiving the outputs from said sequency circuit and said correct exposure time estimating circuit.

6. The device of claim 5 further comprising means for igniting said discharge tube.

7. The device of claim 6 wherein said means for igniting said discharge tube comprises a time constant circuit including a capacitor connected in parallel to said discharge tube; a relay drive circuit; and high voltage applying means for generating a high voltage to initiate discharge of said tube, said high voltage applying means controlled by said relay drive circuit.

8. The device of claim 7 further comprising a timer to control the time duration of said high voltage.

9. The device of claim 7 further comprising detecting means to terminate said high voltage when said light source and said endoscope are not properly secured.

* * * * *